United States Patent
Garity

[11] Patent Number: 6,070,338
[45] Date of Patent: Jun. 6, 2000

[54] DEVICE FOR MEASURING AND CUTTING SHEETROCK

[76] Inventor: Michael Garity, 2615 Stevens Ave. S., Minneapolis, Minn. 55408

[21] Appl. No.: 09/058,798

[22] Filed: Apr. 13, 1998

[51] Int. Cl.[7] .............................. G01B 3/10; B43L 13/02
[52] U.S. Cl. ............................... 33/760; 33/758; 33/759; 33/42
[58] Field of Search ............................ 33/760, 755, 757, 33/758, 759, 770, 42, 41.1, 41.6

[56] References Cited

U.S. PATENT DOCUMENTS

| 3,036,791 | 5/1962 | Siggelkow | 33/758 |
|---|---|---|---|
| 3,270,421 | 9/1966 | Jones | 33/759 |
| 4,255,856 | 3/1981 | Mackie | 33/770 |
| 5,197,195 | 3/1993 | Aikens | 33/42 |
| 5,206,965 | 5/1993 | Rowley | 33/760 |
| 5,406,711 | 4/1995 | Graham | 33/760 |
| 5,515,617 | 5/1996 | Canfield | 33/770 |
| 5,842,284 | 12/1998 | Goldman | 33/760 |

FOREIGN PATENT DOCUMENTS

| 3141635 | 4/1983 | Germany | 33/758 |
|---|---|---|---|

*Primary Examiner*—Christopher W. Fulton
*Attorney, Agent, or Firm*—Thomas B. Tate

[57] ABSTRACT

A device for measuring and cutting sheetrock comprising an edge guide which has a smooth surface slidable along the edge of a piece of sheetrock, and a wide tape measure readable in both directions and having a tab against which a knife blade can be placed so as to allow the sheetrock to be cut along a line parallel to its edge.

2 Claims, 1 Drawing Sheet

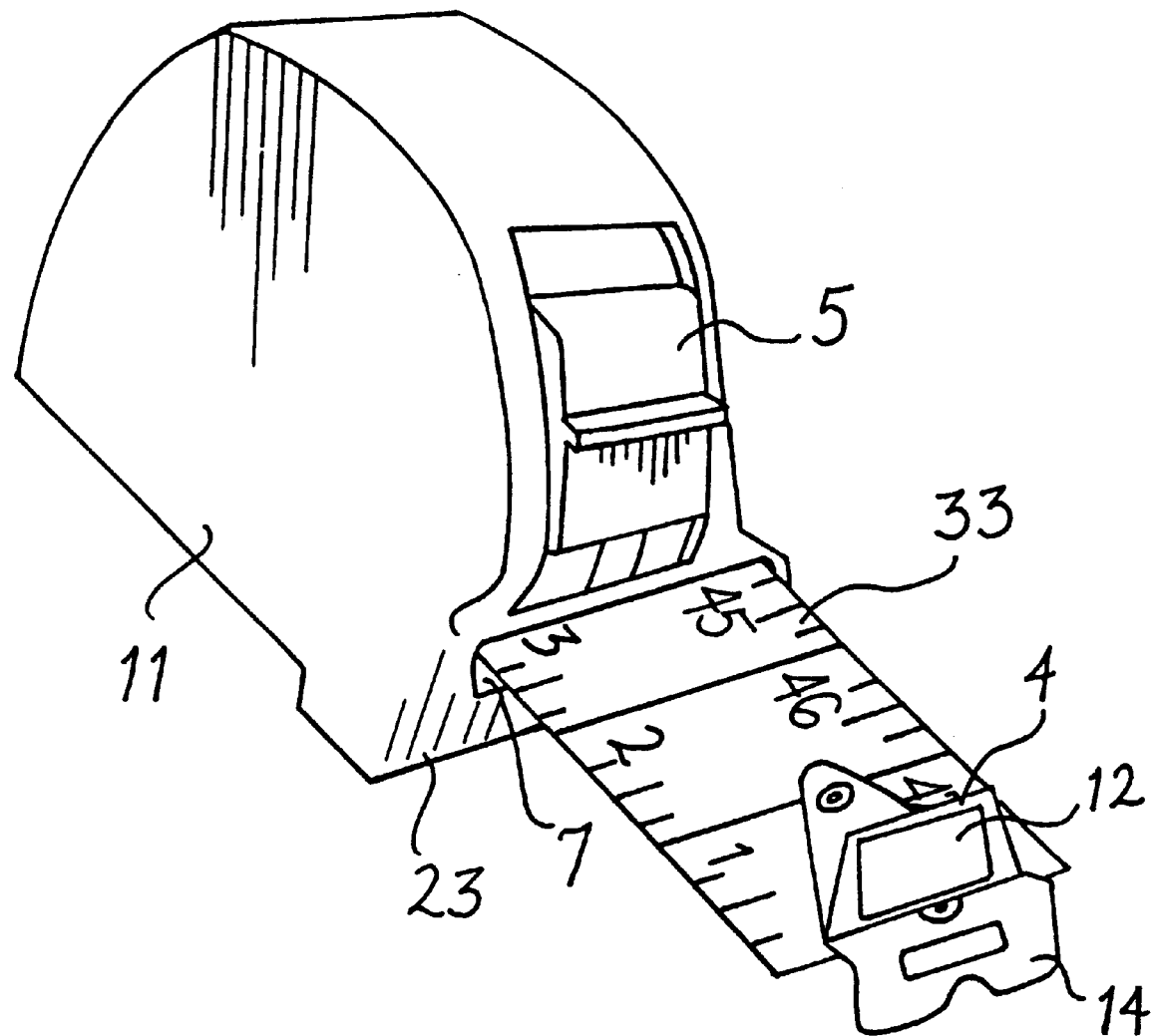

DEVICE FOR MEASURING AND CUTTING SHEETROCK

SUMMARY AND BACKGROUND OF THE INVENTION

The invention is designed for measuring and cutting gypsum board, commonly known as sheetrock. Sheetrock is sold in standard sizes, generally four feet wide by eight feet long. When installing sheetrock on the walls and ceiling of a building, it is often necessary to cut off a strip of uniform width from a standard sheet in order to fit the sheetrock properly into a particular space. At all times when installing sheetrock the uncut edge (known as the factory edge) must line up with other factory edges for seam finishing. Because sheetrock is heavy, it is awkward to turn the sheet around or flip it over so that the edges line up. Therefore the sheetrock must be cut to fit. Sheetrock is usually cut while it is standing on one of its eight foot long edges. The method currently used for doing this is to place the reel of a tape measure at the top edge of the sheet of sheetrock, extend the tape measure down to the desired width (for example, if a three foot wide piece is needed, the installer measures down one foot from the top edge so that the piece left over after cutting will be three feet wide and have the factory edge facing in the proper direction), mark each side of the board, pop a chalk line, cut or score a line freehand or using a straight edge. The sheetrock is then cut along the marked line with a utility knife. This method is time-consuming, and inaccurate measurements can result if the reel slips off the edge of the sheetrock or if the tape measure kinks or bends during measurement.

An advantage of the invention is that it has a wide edge guide to prevent slipping while moving smoothly and parallel along the edge of the sheet.

Another advantage is that the invention has an extra wide tape measure for precision and stability while making cuts.

Another advantage is that the tape measure can be read in either direction, allowing accurate measurement while avoiding the need to measure up from the bottom.

Another advantage is that the invention has a tip at the end of the tape measure which can be used to hold a common razor knife against it for making cuts. No specially made blades are needed in order to use the invention.

DESCRIPTION OF THE DRAWING

The FIGURE is a perspective view.

DESCRIPTION OF THE INVENTION

The invention is a device for measuring and cutting sheetrock. The device comprises a housing 11 which has an edge guide 23 formed at one end of its base, and a tape measure 33 which has a tab 4 formed at its end which is distal to the edge guide 23.

The housing 11 has mounted on its outside surface a conventional locking mechanism 5. A reel (not shown), which is conventional except for its size, is located within the housing 11, and the tape measure 33 is mounted thereon. The tape measure 33 projects through a slot 7 formed in the housing 11 and can be extended at a ninety degree angle to the edge guide 23.

The edge guide 23 is wide and has a smooth coated surface so as to allow easy sliding along the edge of a piece of sheetrock. Usually the surface of the edge guide 23 which contacts the edge of the sheetrock is straight (as shown in the FIGURE), but alternatively the edge guide 23 may be provided with a notch edge which projects horizontally at a ninety degree angle from the edge guide 23 in order to provide additional control while the edge guide 23 glides along the edge of the sheetrock.

The tape measure 33 is wider than the standard one inch, in order to prevent kinking and bending while the tape measure 33 is being moved parallel to the edge of the sheetrock. Optimally the tape measure 33 is one and one-half to one and three-quarters inches wide. The tape measure 33 is also shorter than conventional tape measures, preferably not more than six feet long since this distance is as far as the average person can reach. Optimally the tape measure 33 is four feet long, since four feet is the standard width of sheetrock. The tape measure 33 has two scales so that it can be read in either direction. Along one edge the scale reads in ascending sequence from the end of the tape 33 back toward the housing 11 in the conventional manner (for measuring down from the top edge of the sheetrock), while along the opposite edge the scale reads in descending sequence from the end of the tape 33 back toward the housing 11 (for measuring up from the bottom edge of the sheetrock without having to turn the sheetrock around to take a second measurement). The tape measure 33 has a conventional downward projection 14 for use in extending the tape 33.

At the end of the tape measure 33 which is distal to the edge guide 23, a tab projects upward from the tape measure 33 and is slightly angled toward the housing 11. Optionally a magnetic tip 12 may be attached to the outside surface of tab 4. A conventional utility knife can be held against the tab 4, or against the magnetic tip 12 on versions that have one, for purposes of cutting the sheetrock.

To use the device, place the edge guide 23 onto the edge of a piece of sheetrock, draw the tape measure 33 out to the desired measurement and lock it into position, hold the utility knife against the outside surface of the tab 4 or magnetic tip 12 with the thumb against the inside surface of the tab 4, then draw the tape measure and knife along the edge of the sheetrock, scoring a cut that is parallel to the edge of the sheetrock.

I claim:

1. A device for measuring and cutting sheetrock, said device comprising:
   a housing having a wide edge guide formed at and projecting downward from one end of the base of said housing, said edge guide having a smooth surface and also having a slot defined therein;
   and a tape measure projecting through said slot in said edge guide and extendable at right angles to said edge guide, said tape measure being more than one inch wide, having a scale thereon which reads in ascending sequence continuously numbered from the end of said tape measure which is distal to said housing when said tape measure is extended to the end of said tape measure which is proximal to said housing and another scale thereon which reads in descending sequence continuously numbered from the end of said tape measure which is distal to said housing when said tape measure is extended to the end of said tape measure which is proximal to said housing, and having a tab projecting upward from said tape measure at the end of said tape measure which is distal to said edge guide, said tab being angled slightly inward toward said housing.

2. The device of claim 1 wherein said tape measure is additionally provided with a magnetic tip which is affixed to the outside surface of said upwardly projecting tab.

* * * * *